Feb. 2, 1937.    F. W. WIEDER    2,069,568
FREE RUNNING SULPHUR
Filed March 9, 1936
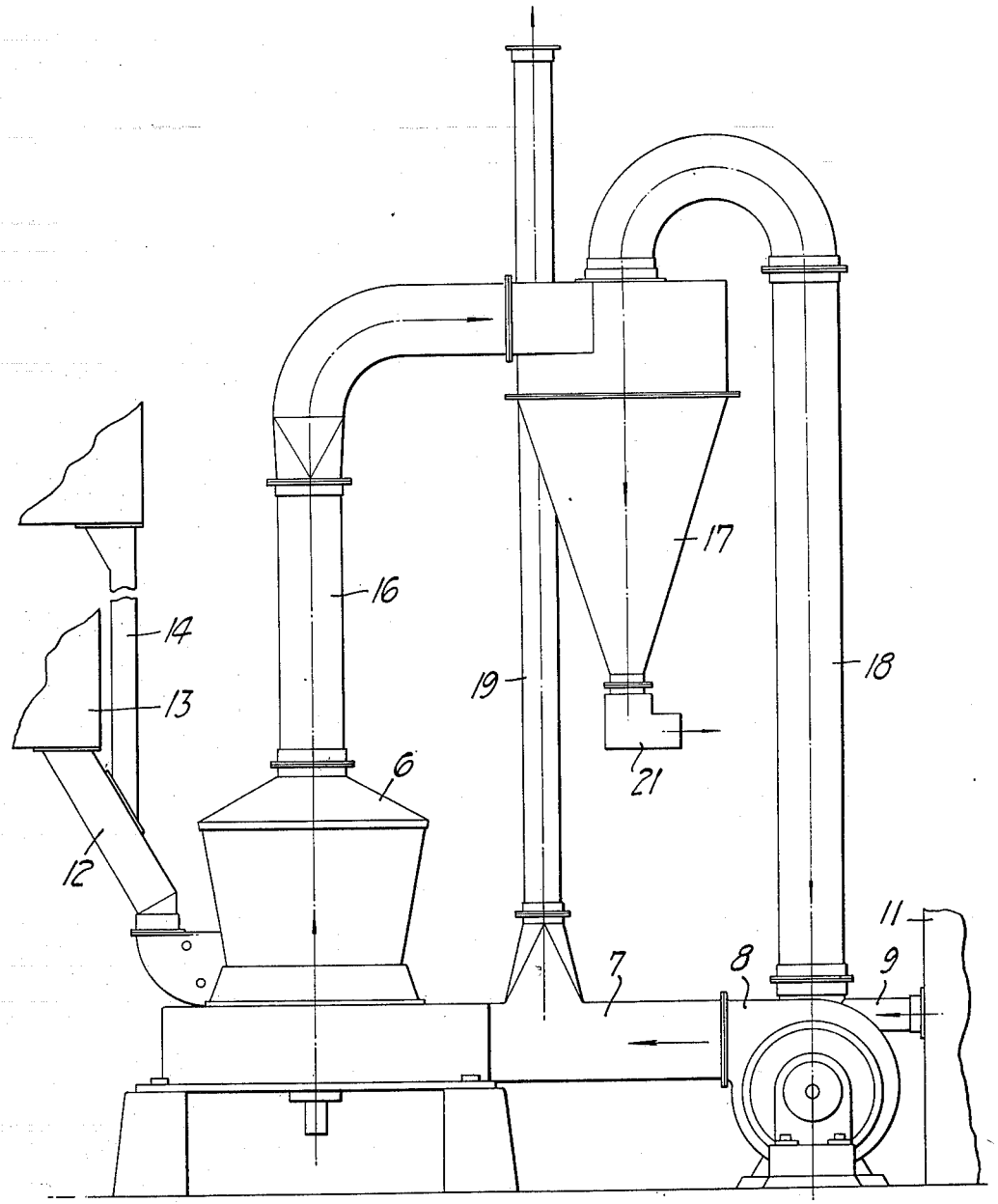
INVENTOR.
Ferd W. Wieder
BY Robert H. Eckhoff
ATTORNEY.

Patented Feb. 2, 1937

2,069,568

UNITED STATES PATENT OFFICE 2,069,568

FREE RUNNING SULPHUR

Ferd W. Wieder, Berkeley, Calif., assignor to San Francisco Sulphur Company, a corporation of California Application March 9, 1936, Serial No. 67,941

5 Claims. (Cl. 23—243)

The application of sulphur as a fungicide and insecticide is well known. The sulphur, in finely divided form, is blown as a dust upon the vegetation. While this form of application has recognized merits, there is one drawback in that aggregation of the finely divided sulphur into larger particles which, because of their mass, do not stick to the vegetation, lessens the effectiveness of the treatment.

Various means have been suggested to overcome this tendency of sulphur aggregate and in Patent 1,629,528, Pough has suggested the use of finely divided magnesium carbonate. Others have suggested the addition of different heterogeneous materials to the sulphur as bentonite.

It is the discovery of this invention that when the sulphur is ground in the presence of a conditioner the sulphur can be reduced to a much finer form and, in this form, it is more effective when applied to vegetation for the fine sulphur particles are acted upon more readily under the atmospheric conditions existing and to which the finely divided sulphur is subjected.

In addition it is a further discovery of this invention that certain conditioners, particularly dicalcium phosphate, can be advantageously used in the conditioning of the finely divided sulphur.

It is an object of the present invention to improve upon methods of producing sulphur dust for use as fungicides and insecticides.

A further object of the present invention is to provide for the conditioning of sulphur dusts so that they remain free flowing and can be readily dusted upon vegetation.

The invention includes other objects and features of advantage, some of which, together with the foregoing will appear hereinafter wherein a present preferred manner of practicing the invention is disclosed.

In the drawing, the single figure is a diagrammatic showing of certain apparatus which can be employed for carrying out the process of the present invention.

In the form of apparatus which I have chosen as diagrammatic and representative of suitable means for practicing the present invention, I provide a suitable mill 6. This mill can be of any of the well known types utilized for fine grinding of materials such as a Sturtevant or a Raymond mill. The mill chosen is preferably one through which a current of gas can be passed and in the drawing I have shown a conduit 7 as connecting a blower 8 with the base of the mill  In the grinding of sulphur it is preferable that the operation be carried out in a non-oxidizing atmosphere, preferably one inert so that explosions can be avoided and I have shown the intake of the blower as connected by a conduit 9 to a source of $CO_2$ gas such as a furnace 11. The stack gas from the furnace is cooled and then passed into the blower so that the whole system operates essentially upon an inert atmosphere.

Sulphur, either alone or suitably mixed with a conditioner is introduced through pipe 12 from a bin 13. If the conditioner is introduced with the sulphur, the cost of operation is reduced and the thorough mixing of the conditioner and the sulphur takes place in a very adequate manner. At the same time, the conditioner is always effective to maintain the sulphur in a free flowing condition so that whatever state of subdivision is attained in the mill, that state is maintained thereafter. The conditioner can be incorporated in the sulphur directly, as by melting it in with the sulphur while it is undergoing refining by melting. Thus I can add such materials as iodine, naphthenic acids, the broad class of organic bases, aniline, quinoline, iso-quinoline, and benzoyl-chloride. These materials are preferably melted in with the sulphur and thoroughly mixed with the molten sulphur so that they are adequately incorporated. Usually about 1% of these materials suffice to provide very adequate protection.

Instead of adding a homogeneous conditioner I can add one which must be mixed with the sulphur, such as the prior art conditioner of Pough, magnesium carbonate or, if I wish to produce much more finely divided and better conditioned sulphur I can add such materials as the light and fluffy zinc oxide, carbonate or sulphide or other water insoluble non-hygroscopic zinc compounds. However, it is my discovery that dicalcium phosphate is better than any of these heterogeneous conditioners for it overcomes any tendency of the sulphur to lump or ball even though it is packed under pressure in the damp. In fact, the adhesiveness of the sulphur is improved insofar as adherence to foreign surfaces is concerned so that the sulphur sticks well to plants but not to itself. The storage quality is the best of any heterogeneous sulphur mixture known to me for the sulphur remains free flowing and non-sticking even when it is stored for a long time under damp conditions. The sulphur thus has the property of sticking well to plants while it does not stick to itself.

The dicalcium phosphate is quite efficient and only a few per cent (1 to 10%) per weight need be used. In practice I usually use about two per cent, adding the finely divided dicalcium phosphate either before, during or after grinding the sulphur and thoroughly intermixing the two. However, I prefer to add the dicalcium phosphate during the grinding for its incorporation is thus facilitated and a more finely divided sulphur can be attained, one having superior dusting qualities.

The dicalcium phosphate seems to act as a lubricant between the sulphur crystals, particularly when a sulphur is finely divided. Thus, I have found it to be more effective on a fine sulphur than any other cold mixed heterogeneous diluent such as magnesium carbonate even when the sulphur is smaller than 100% passing 100 mesh, 100% passing 200 mesh with 98% passing 300 mesh and a goodly portion (50%) of the material passing a 600 mesh screen.

The gas stream flowing through the mill 6 is passed out through a pipe 16. This pipe 16 is usually extended for a vertical distance of about 12 feet so as to provide a gas column up which the finely divided sulphur, usually admixed with the conditioner, must pass to enter into separator 17. Particles removed from the mill but too heavy to be lifted by the gas stream drop back into the mill and are ground further so that by regulating the amount of air passed through the mill, its velocity and volume, by suitable means, the particle sizing of materials collected in the base of separator 17 can be governed. The gas separated from the sulphur settling out in the separator 17 is returned to pipe 18 back to the inlet of the blower. Excess gas is let off through regulated outlet 19.

The finished material is drawn off through outlet 21 from the base of the separator, this material being sacked, and is then ready for distribution and use.

Instead of adding the conditioner to the sulphur undergoing grinding, the conditioner can be added to the sulphur after it is in finely divided form. This is done by mixing in the conditioner with the sulphur in a suitable mixing device. However, this is not desirable inasmuch as the sulphur, immediately after it is ground, has quite a tendency to lump, pack and form into the larger aggregates. For example, sulphur which initially was so fine as to be 100% through 300 mesh, after six hours was only 75% through 300 mesh, due to aggregation. This is avoided by addition of the conditioner during grinding. Of course, once the aggregates are formed, they have to be disintegrated again, sufficient power being required to secure their disintegration so that in effect the sulphur must be re-ground. It is therefore preferred to add the sulphur and conditioner when the sulphur is being ground initially. This is preferred also for the further reason that finely divided sulphur, sulphur of the order of 600 and 800 mesh and having 100% passing a 300 mesh screen can be made by adding the conditioner to the sulphur while it is undergoing grinding.

This application is a continuation in part of my application Serial No. 23,717, filed May 27, 1935, which application has been abandoned in favor of this application.

I claim:

1. A free flowing sulphur dust consisting essentially of a finely divided free flowing mixture of sulphur and between 1 and 10% of dicalcium phosphate.

2. A free flowing sulphur dust consisting essentially of a finely divided free flowing mixture of sulphur and about 2% of dicalcium phosphate.

3. A free flowing sulphur dust consisting essentially of a finely divided free flowing mixture of sulphur and dicalcium phosphate all finer than a 200 mesh screen and having less than about 2% remaining on a 300 mesh screen.

4. A method of producing a free flowing finely divided sulphur dust comprising grinding sulphur to finely divided form in the presence of a sulphur conditioner selected from the group consisting of magnesium carbonate, water insoluble non-hygroscopic zinc compounds and dicalcium phosphate, while subjecting the mass undergoing grinding to action of a gas stream tending to carry particles away from the mass thereof undergoing grinding while returning to the grinding particles too large for removal by said stream and separating from said gas stream a free flowing finely divided mixture of sulphur and conditioner removed by said stream from the grinding operation.

5. A method of producing a free flowing finely divided sulphur dust comprising grinding sulphur to finely divided form in the presence of about 2% of dicalcium phosphate as a sulphur conditioner acting to make the sulphur free flowing when said sulphur is in finely divided form while subjecting the mass undergoing grinding to action of a gas stream tending to carry particles away from the mass thereof undergoing grinding while returning to the grinding particles too large for removal by said stream and separating from said gas stream a free flowing finely divided mixture of sulphur and conditioner removed by said stream from the grinding operation.

FERD W. WIEDER.